United States Patent
Jobson et al.

(10) Patent No.: US 6,940,190 B2
(45) Date of Patent: Sep. 6, 2005

(54) ELECTRIC MACHINE

(75) Inventors: Edward Jobson, Romelanda (SE); Erland Max, Vastra Frolunda (SE)

(73) Assignee: Volvo Technology Corporation, Göteborg (SE)

( * ) Notice: Subject to any disclaimer, the term of this patent is extended or adjusted under 35 U.S.C. 154(b) by 0 days.

(21) Appl. No.: 10/710,117

(22) Filed: Jun. 18, 2004

(65) Prior Publication Data

US 2004/0222704 A1 Nov. 11, 2004

Related U.S. Application Data

(63) Continuation of application No. PCT/SE02/02410, filed on Dec. 19, 2002, now abandoned.

(30) Foreign Application Priority Data

Dec. 21, 2001 (SE) .............................................. 0104378

(51) Int. Cl.[7] .............................................. H02K 41/00
(52) U.S. Cl. ....................................................... 310/12
(58) Field of Search ..................................... 310/12–14

(56) References Cited

U.S. PATENT DOCUMENTS

| | | | | |
|---|---|---|---|---|
| 3,579,001 A | * | 5/1971 | Pelenc ........................... 310/13 |
| 4,594,524 A | * | 6/1986 | Sudo ........................... 310/68 R |
| 4,912,343 A | * | 3/1990 | Stuart ............................ 310/14 |
| 5,486,727 A | * | 1/1996 | Heidelberg et al. ............ 310/12 |
| 5,495,131 A | | 2/1996 | Goldie et al. .................. 310/12 |
| 5,723,928 A | | 3/1998 | Imai et al. ..................... 310/114 |
| 5,751,089 A | | 5/1998 | Stridsberg ..................... 320/266 |
| 6,300,691 B1 | * | 10/2001 | Hwang et al. ................. 310/12 |
| 6,825,581 B1 | * | 11/2004 | Joong et al. ................... 310/12 |
| 6,864,601 B2 | * | 3/2005 | Sogard ......................... 310/12 |

FOREIGN PATENT DOCUMENTS

WO    WO 9923744 A1    5/1999

* cited by examiner

Primary Examiner—Darren Schuberg
Assistant Examiner—Judson H. Jones
(74) Attorney, Agent, or Firm—Novak Druce & Quigg, LLP (57) ABSTRACT

An electric machine including a first member and a second member. The second member is movable in relation to the first member. The first member has at least one coil and the first and the second members both include a plurality of segments, where each segment of the first member comprises a plurality of sections have a first magnetic conducting material. Each segment of the second member includes a plurality of sections having a second magnetic conducting material, and in which the first and the second member includes a closed magnetic circuit.

16 Claims, 10 Drawing Sheets

ELECTRIC MACHINE

CROSS-REFERENCE TO RELATED APPLICATION

The present application is a continuation patent application of International Application No. PCT/SE02/02410 filed 19 Dec. 2002, now abandoned, which was published in English pursuant to Article 21(2) of the Patent Cooperation Treaty, and which claims priority to both Swedish Application No. 0104378-5 filed 21 Dec. 2001. Said applications are expressly incorporated herein by reference in their entireties.

TECHNICAL FIELD

The present invention relates to an electric machine comprising a stator and a rotor, where the rotor is movable in respect to the stator about the longitudinal axis of the electric machine.

BACKGROUND ART

Electric machines are well known in the art. They can be either of the electric motor type that produces a force when electric energy is supplied, or of the generator type that generates electric energy when a mechanical force is applied to the generator. There exists both rotary and linear electric machines. A problem with electric motors is that the torque the motor can deliver is limited by the ferro-magnetic core which will saturate at a certain current level. Above this current level, the torque will not increase but the heat produced in the core will increase. When the core is heated, the magnetic properties will deteriorate as is the case with most magnetic materials.

The problem is particular troublesome when it comes to linear motors. The moving part of the motor, in this application referred to as the rotor, is often limited in size and thus the maximum electric field that can be applied to it is limited. This leads to an insufficient acceleration in different applications.

Different possible solutions to solve the problem with the limited delivered torque are known in the art. For a stationary motor, this can be dealt with, for example, by increasing the size of the motor. In applications where size and weight are of importance, different exotic materials are used in the ferro-magnetic core. The core can also be laminated in different ways, and different geometric layouts are known in which the core is "distributed" in the magnetic field in an optimum manner.

In applications where a linear motor is used to control an electrically actuated valve, the limited torque is apparent. To be able to provide a somewhat useable solution, the present known systems for controlling an electrically actuated valve utilize a system comprising an electromagnet and a spring set up in a resonant system. In this way it is possible to adjust the valves somewhat. These systems are difficult to control and it is only possible to adjust the valves slightly during a cycle.

In applications where an electric machine is used in connection with a free piston engine, a conventional linear electric machine can be used to take out the average power when the piston is in a resonance state.

It is desirable to control the movement of the piston in each cycle, for instance, to control the combustion. This is difficult to achieve with conventional electric machines since such machines have a relation between the electric force and the mass of the rotor which is about ten times too low.

DISCLOSURE OF INVENTION

An objective of the present invention is to provide an electric machine having a higher magnetic torque relative to its size and/or weight than conventional electric machines.

The object of the invention is achieved by an electric machine comprising (including, but not necessarily limited to) a first member and a second member. The second member is movable in relation to the first member. The first and second members comprise a closed magnetic circuit. The first member comprises at least one coil and a plurality of first segments, each first segment comprising a plurality of first sections, and each first section being a first magnetic field altering component. The second member comprises a plurality of second segments, each second segment comprising a plurality of second sections, and each second section being a second magnetic field altering component.

In one embodiment of an electric machine configured according to the teachings of the present invention, an electric machine is provided with a very high power-to-weight ratio. This is obtained by incorporating a first and a second set of magnetic field altering components which in this preferred embodiment is made of iron powder or ferrite. The electric machine can be used as a generator or a motor. As a generator, it can deliver a high output compared to its size. When used as a motor, it can accelerate at a fast pace due to the low mass of the moving parts.

In an advantageous first development (version) of the electric machine, the second set of magnetic field altering components is made of permanent magnets. This further improves the efficiency of the electric machine.

In an advantageous second development of the electric machine, the first set of magnetic field altering components are made of air coils. This improves the acceleration ability of the electric machine.

In an advantageous third development of the electric machine, the electric machine comprises a plurality of first members. This gives a polyphase electric machine. The advantage of this is that it improves the controllability of the electric machine when used as a motor and the continuous power output when used as a generator.

In an advantageous fourth development of the electric machine configured according to the present invention, the electric machine comprises three first members thereby establishing a three-phase electric machine. The advantage of this is that conventional three-phase equipment can be used.

BRIEF DESCRIPTION OF THE DRAWINGS

The invention will be described in more detail below, with reference to preferred embodiments as shown in the drawings attached, in which:

FIG. 1b is a perspective side view of the electric machine of FIG. 1a;

FIG. 2b is a perspective side view of the electric machine according to FIG. 2a;

MODE FOR THE INVENTION

The preferred embodiments of the invention and developments described below must be regarded solely as examples and in no way limit the scope of the patent claims. In the preferred embodiments described herein, the same reference numbers in the various figures relate to the same type of parts. Each part is therefore not described in detail in all preferred embodiments.

Figure 1A:
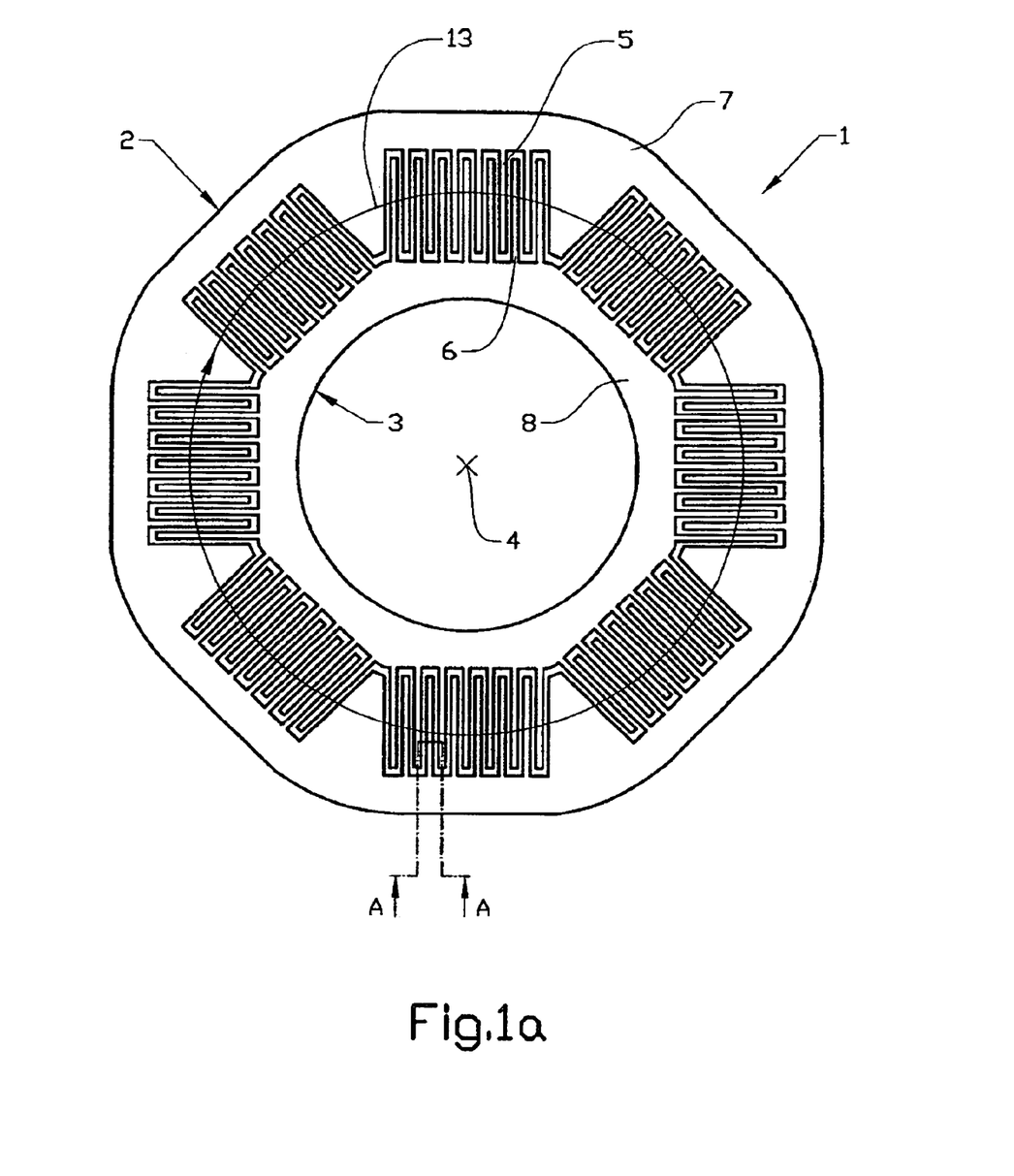
FIG. 1a is a schematic top view of a first preferred embodiment of an electric machine configured according to the teachings of the present invention.

In a first preferred embodiment of an electric machine 1 that is configured according to the teachings of the invention, the electric machine is arranged in a circular configuration as depicted in FIGS. 1a, 1b, 2a and 2b. The electric machine comprises a first member 2, which will be referred to as the stator 2, and a second member 3, which will be referred to as the rotor 3. The stator 2 is normally fixed by mounting it to a rigid structure, but it is also possible to mount it in a movable manner. The rotor 3 is movable in relation to the stator 2 about the longitudinal axis 4 of the machine. In FIG. 1a, the longitudinal axis 4 of the electric machine is perpendicular to the paper plane. The stator 2 and the rotor 3 comprise a closed magnetic circuit, indicated with arrow 13. It is also possible to mount the rotor 3 in a fixed way and permit the stator 2 to move in relation to the rotor 3.

In FIG. 1a, it can be seen that the stator 2 comprises a plurality of stator segments 5, positioned in a circular manner, where each segment is fixed to the stator body 7 and pointing inwardly. The rotor 3 comprises a plurality of rotor segments 6, positioned in a circular manner, where each segment is fixed to the rotor body 8 and is pointing outwardly. Each stator segment 5 and each rotor segment 6 are placed adjacent to each other, with a narrow air gap in between. The air gap is advantageously as narrow as possible. Each stator segment 5 comprises a plurality of stator sections 10. Each rotor segment 6 comprises a plurality of rotor sections 11.

The stator 2 and the rotor 3 are fitted with a suitable bearing arrangement, not shown. In FIG. 1a, some of the stator segments 5 are V-shaped. This can be advantageous when the electric machine is built in a modular way.

Figure 2A:
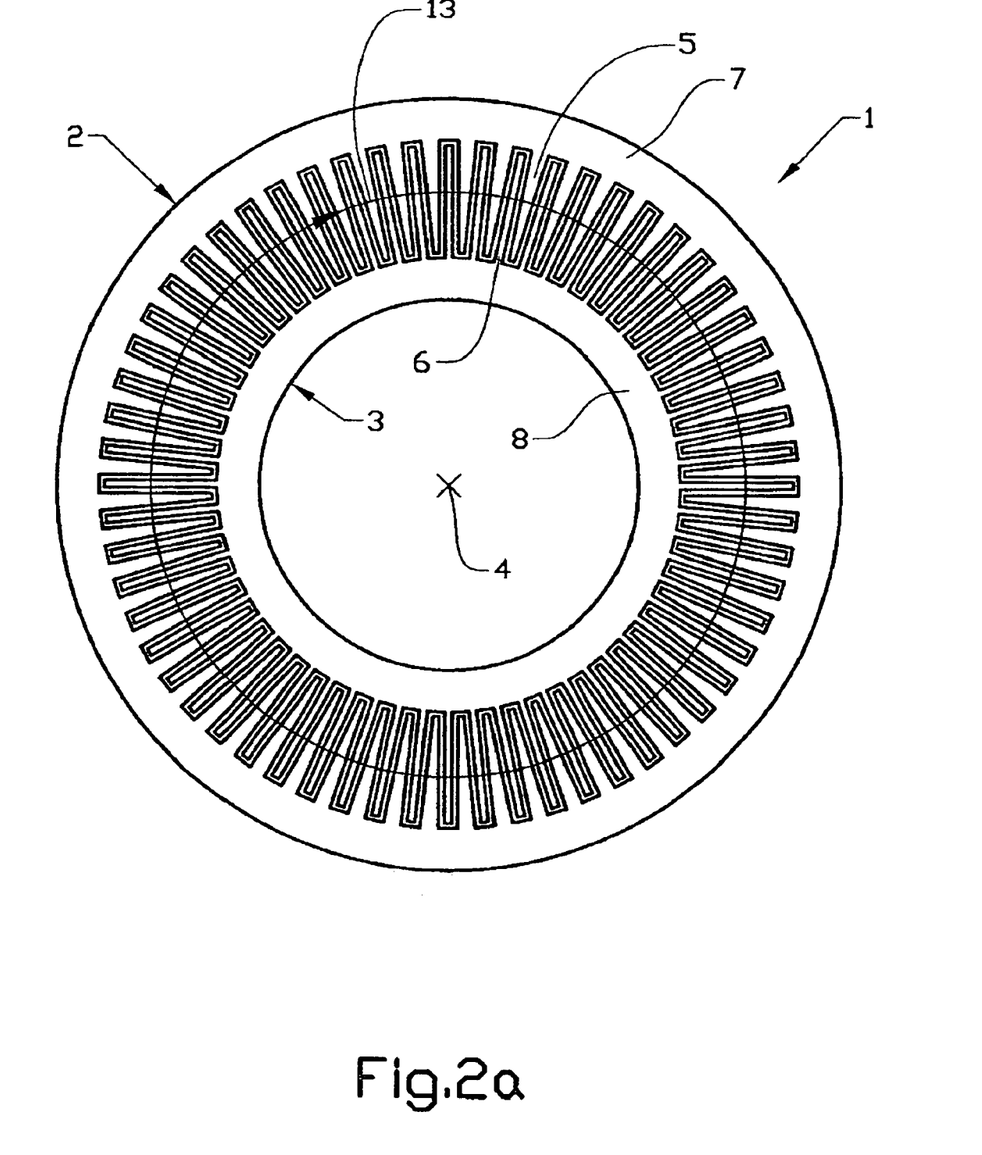
FIG. 2a is a schematic top view of an advantageous development of an electric machine configured according to the present invention.
Figure 2B:
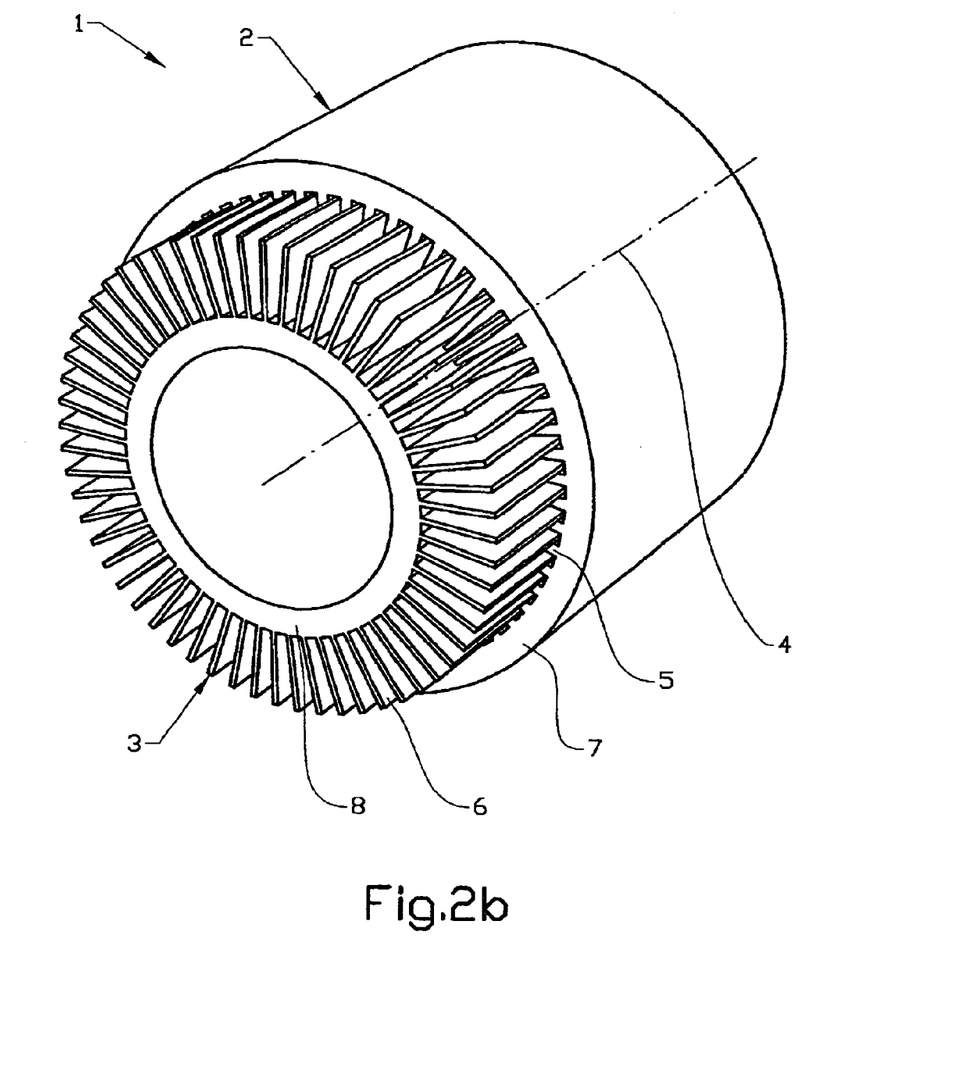

In an alternative embodiment of the electric machine, the stator segments 5 and/or the rotor segments 6 can be wedge-shaped in the radial direction of the electric machine as shown in FIGS. 2a and 2b in which the stator segments 5 are wedge-shaped and the rotor segments 6 are uniform. Wedge-shaped stator and/or rotor segments can be advantageously utilized depending on the production method with which the electric machine is produced. It is important that the air gaps between the segments are uniform and that the segment surfaces are parallel.

The rotor 3 will move backwards and forwards along the longitudinal axis 4. The main extension of the stator segments 5 and rotor segments 6 lies along this axis 4; that is, along this axis 4, the segments 5, 6 have their greatest physical dimension. The main extension of the stator sections 10 and the rotor sections 11 are perpendicular to the longitudinal axis 4. The closed magnetic circuit 13 is perpendicular to both of these axes.

Depending on the use for which the electric machine is designed, either the stator 2 or the rotor 3 can be extended along the longitudinal axis 4. An electric machine where the stator is much longer than the rotor will have an improved efficiency, whereas the maximum obtainable acceleration for the electric machine will be improved with a shorter rotor, having a lower mass.

Figure 3:
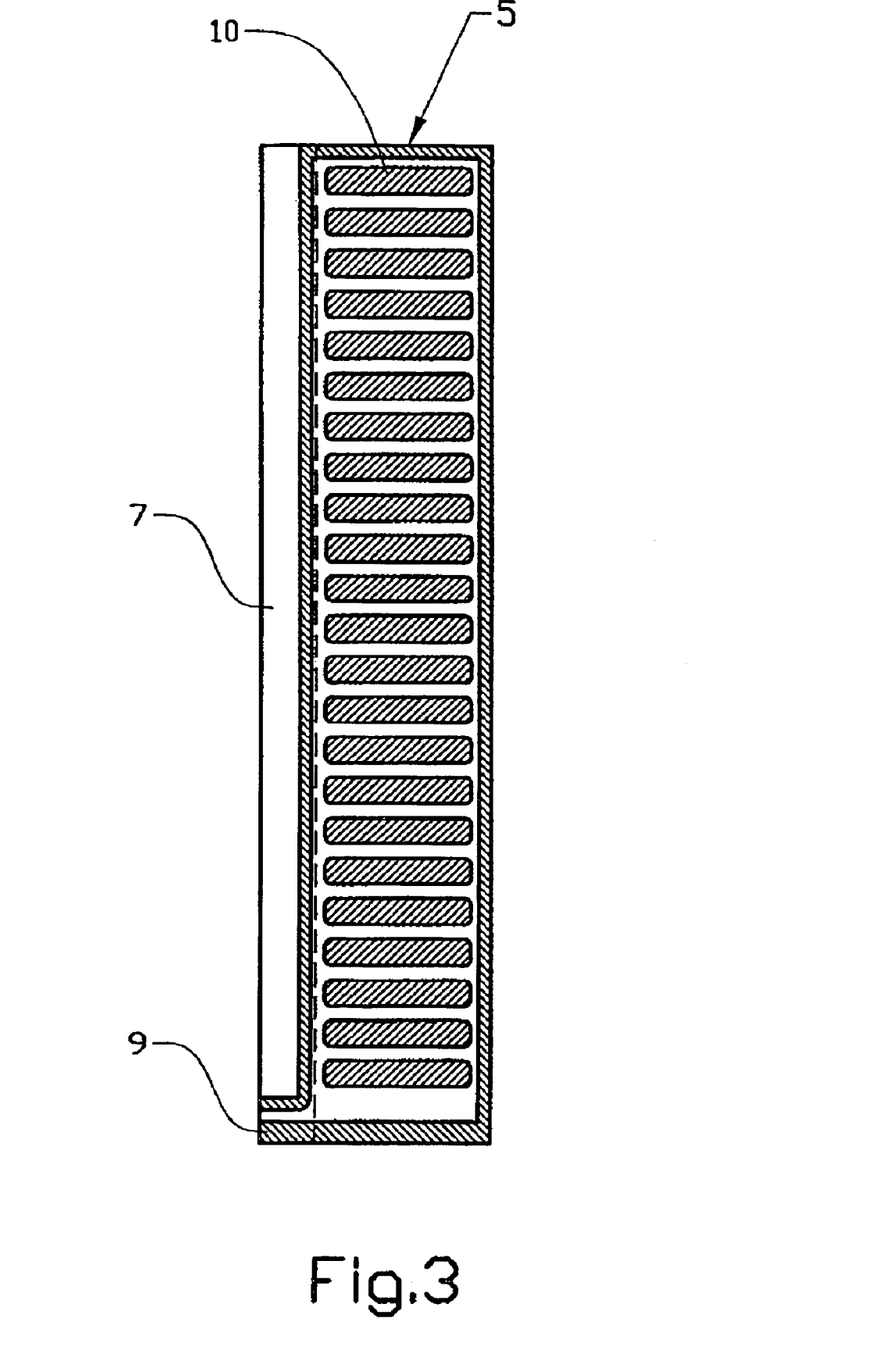
FIG. 3 is a schematic view of a first segment of an electric machine according to FIG. 1.

FIG. 3 shows a side view of a stator segment 5. The stator segment 5 comprises a coil 9 encompassing a plurality of stator sections' 10. In this example, the sections 10 consist of quadratic bars made of a magnetic conducting material such as iron-powder or a ferrite material. The saturation flux of the magnetic conducting material is preferably as high as possible. The bars are spaced apart in a regular manner, the spacing being approximately the same as the width of a bar. The coil 9 is made of a conducting material, preferably a material with low resistivity such as copper or a superconductor.

As an example, the illustratively disclosed segment is 40 mm wide, 200 mm high and 5 mm thick. A section is 5 mm by 20 mm by 5 mm. The vertical spacing between the sections is 5 mm. The coil is 10 mm wide and 5 mm thick, the area being as large as possible to reduce losses. A typical electric machine can have, for example, 30 stator segments and 30 rotor segments.

In this embodiment, each stator segment 5 comprises a coil 9. It is also possible to position the coils 9 in the stator 2 in a more condensed way. In this case, the coils are positioned symmetrically, but only at a few of the segments; for example, at every fifth segment. To obtain the same magnetic properties, the total coil area of the electric machine should be the same, regardless of the positioning of the coils 9. A coil 9 can have one or more turns.

A segment 5 is largely made up from the coil 9, the bars 10 and a filling material that fills up the spaces between the bars and the coil. To enhance mechanical properties, other materials may also be used; for example, a ceramic surrounding the entire segment 5. An exemplary suitable filling material is an epoxy resin with glass fiber reinforcement or a ceramic material. It is also possible to laminate the segment 5 with another non-magnetic material to obtain higher strength; for instance, a ceramic. When the segment 5 consists of two layers of ceramic with the bars 10 in between, the filling material can also be air. Another possibility is to include a magnetic material in the filling material between each bar 10 in order to optimize the magnetic properties.

This magnetic material is preferably placed in the center of the filling material. It is also possible to use a magnetic field altering material that differs from the material of the bars 10 as the filling material.

Another way to produce the segments is to use a thin-film or tape-cast technique. In this case, the sections are placed or printed on a substrate; for example, a ceramic material that is then laminated with another substrate such as a ceramic material. Depending on the design, a plurality of layers can be laminated to obtain the desired electrical and/or mechanical properties.

Figure 4:
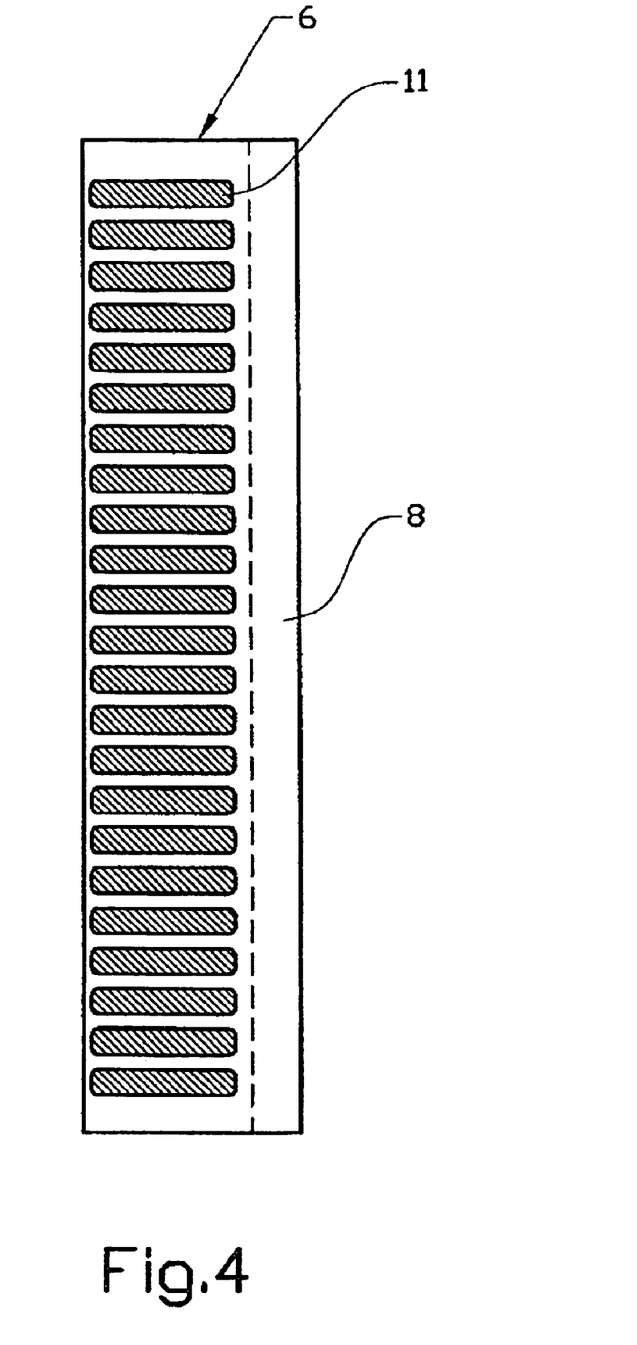
FIG. 4 is a schematic view of a second segment of the electric machine according to FIG. 1.

FIG. 4 shows a side, perspective view of a rotor segment 6. The rotor segment 6 is built in the same way as a stator segment 5, but without a coil. The rotor segment 6 comprises a plurality of rotor sections 11 consisting of quadratic bars made of a magnetic conducting material; in this case, iron-powder. The bars 11 have the same dimensions as the bars 10 and are made from the same material.

Figure 5A:
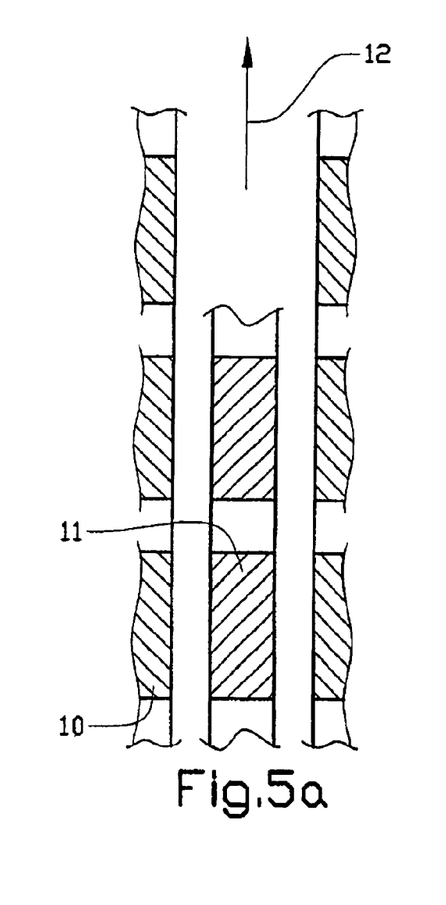
FIGS. 5a–c show a working cycle of the electric machine of FIG. 1.
Figure 5B:
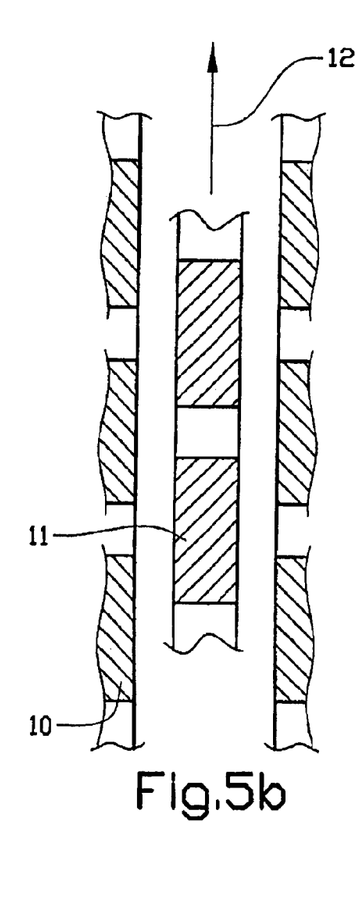
Figure 5C:
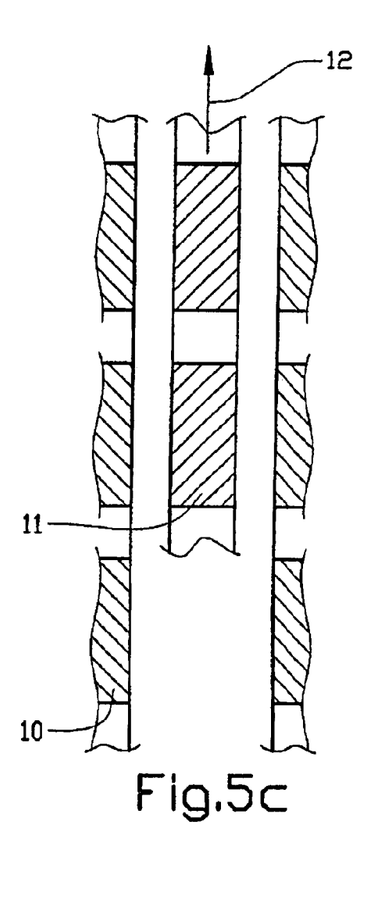

FIGS. 5 a–c shows a split side view along line A—A of FIG. 1. FIGS. 5 a–c serve as an example to explain the function of the electric machine, when used as a generator. For this purpose, only a part of the electric machine is shown, in this case two rotor sections 11 and three pairs of split stator sections 10. When the rotor sections 11 and stator sections 10 are positioned in the same geometric plane, next to each other, as in FIG. 5a, a magnetic field is applied to the electric machine by the coils in each stator segment. The rotor segments are forced to move in one direction, denoted by an arrow 12, by an external force such as a free-piston engine. At the same time, the coils are short circuited, forcing the magnetic field to be constant. Since the time for moving the rotor segments 11 the distance of approximately half a stator section length is short, the magnetic field can be approximately constant during this movement. This state represents a half cycle of the electric machine and is shown in FIG. 5b. With the magnetic field constant, the energy produced by the external force is converted to magnetic energy. This magnetic energy can be extracted from the coils and stored as electric energy, for example, by charging a capacitor.

During the second half period of the electric machine, the magnetic field applied by the coils is removed by inactivating the coil. This is done to prevent the electric machine from acting as a motor during the second half period. At the end of the second half period, for instance when a full cycle is performed, the electric machine will be in a state shown in FIG. 5c. This cycle is then repeated when the electric machine is forced to move in the direction 12. This type of operation can be seen as a pulsed reluctance machine.

Figure 6:
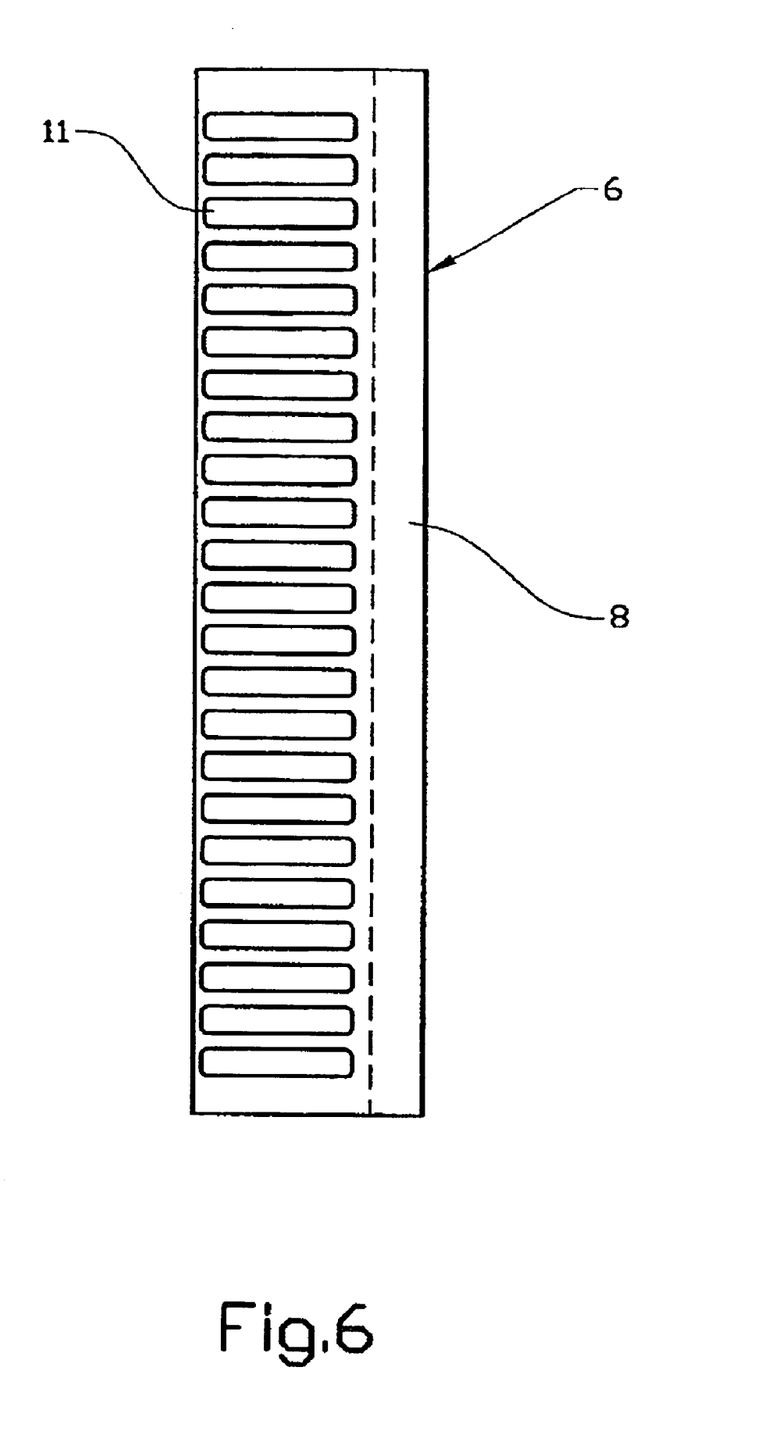
FIG. 6 shows an advantageous development of a second segment configured according to FIG. 4.

In a second preferred embodiment of the electric machine, the rotor sections 11, that is, the magnetic field altering components 11, consist of short circuited coils. The outline size is approximately the same as for the square bars of iron-powder described above. FIG. 6 shows a rotor segment 6 where the rotor sections 11 consist of short circuited coils 11. The stator sections in this embodiment consist of one of the mentioned magnetic field altering components. The design of the electric machine apart from the short circuited coils 11 can, but does not have to be the same as described above. The advantage of using coils is that the rotor weight is reduced, thus the rotor obtains a higher acceleration factor. The short circuited coils 11 can be either air coils or coils with a core. A short circuited coil 11 with a core has a higher inductance and a higher weight. In this embodiment, the filling material can be either a magnetic or a non-magnetic material. With the filling material being magnetic, the magnetic field in the electric machine can be higher, but the magnetic material can saturate. With a non-magnetic material as the filling material, there will be no saturation drawbacks, but the resistivity losses will be higher. Depending on the design of the electric machine, a suitable filling material is chosen.

In a third preferred embodiment of the electric machine, the stator sections 10, exemplarily the magnetic field altering components 10, consist of quadratic bars made out of a permanent magnetic material. The rotor sections 11; i.e., the magnetic field altering components 11, consist of an iron-powder or a ferrite material. The design apart from the magnetic field altering components 10 can, but does not have to be the same as described above. The permanent magnets 10 should be positioned so that all magnets 10 are positioned with the magnetic field in the same direction.

The advantage of using permanent magnets as the magnetic field altering components is that permanent magnets give a higher magnetic field and a higher magnetic torque at a lower current than, for example, iron-powder or ferrite. This gives the electric machine a higher degree of efficiency. Permanent magnets are more expensive and more sensitive to shock than the examples of iron-powder or ferrite.

In a fourth preferred embodiment of the electric machine, the stator sections 10 (the magnetic field altering components 10) consist of quadratic bars made out of a permanent magnetic material. The rotor sections 11 (the magnetic field altering components 11) consist of an iron-powder or a ferrite material. The design of the electric machine apart from the magnetic field altering components 10 can, but does not have to be the same as described above. The permanent magnets 10 should be positioned so that all magnets 10 are positioned with the magnetic field in the same direction. In this embodiment, the spaces between the sections in the stator (the stator filling material), also consist of permanent magnets. These filling magnets are oriented with their magnetic field in the opposite direction to that of the permanent magnets 10. This further improves the efficiency of the electric machine.

In further developments of the invention, it is also possible to use other combinations of the materials mentioned above for the stator sections 10 and the rotor sections 11. Depending on such variables as (1) the design of the electric machine, (2) the application for which the electric machine is intended, (3) the desired characteristics of the electric machine, and (4) cost, it is possible to select an appropriate combination of materials. It is also possible to use different materials for the stator sections 10 and/or the rotor sections 11 in the same segment. A stator segment can, for example, contain both sections made of iron-powder and sections made of short circuited coils.

Figure 1B:
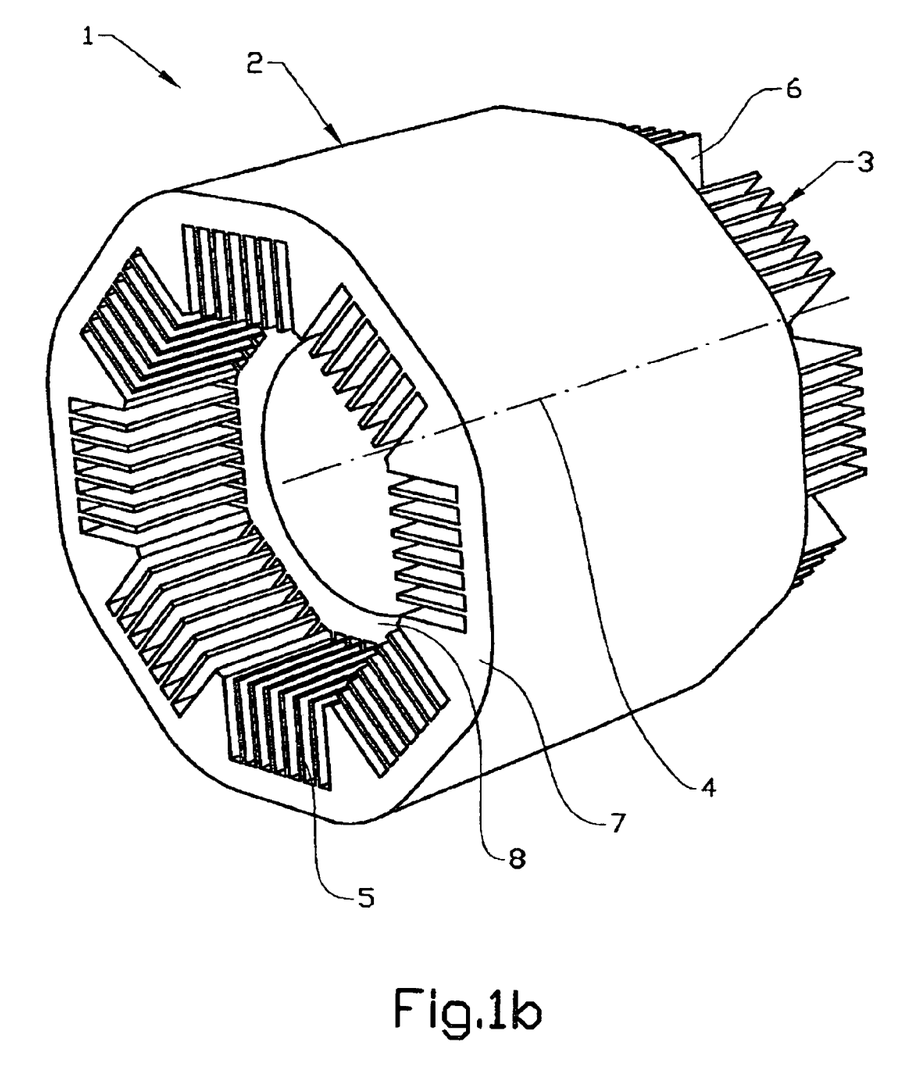

In a fifth preferred embodiment of the electric machine, the electric machine comprises a plurality of first members 2, such as the stators 2, located adjacent to each other along the longitudinal axis 4. In this example, an electric machine with three stators 2 will be described. The layout of these stators 2 can be the same as shown in FIG. 1b or 2b. The second member 3, exemplarily the rotor 3, is preferably long enough to correspond to all the stators 2. The layout of the rotor 3, apart from the length, can be the same as shown in FIG. 1b or 2b.

The stators 2 are electrically phase displaced in an equal manner, in the illustrative example, approximately 120 degrees. This embodiment improves the possibility to generate continuous energy with the electric machine as a generator or to improve the control of the electric machine when used as a motor. With a displacement of 120 degrees, a three-phase machine is obtained. It is also possible to choose another number of stator members if desired. It is advantageous that the phase displacement is derived from dividing a full cycle with the number of first members 2.

Figure 7:
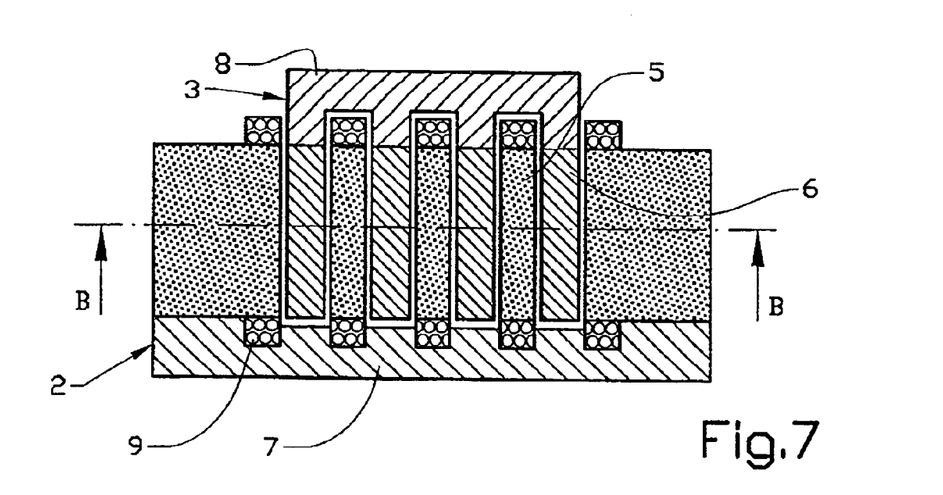
FIG. 7 shows a top view of a second advantageous development of the electric machine configured according to the invention.
Figure 8:
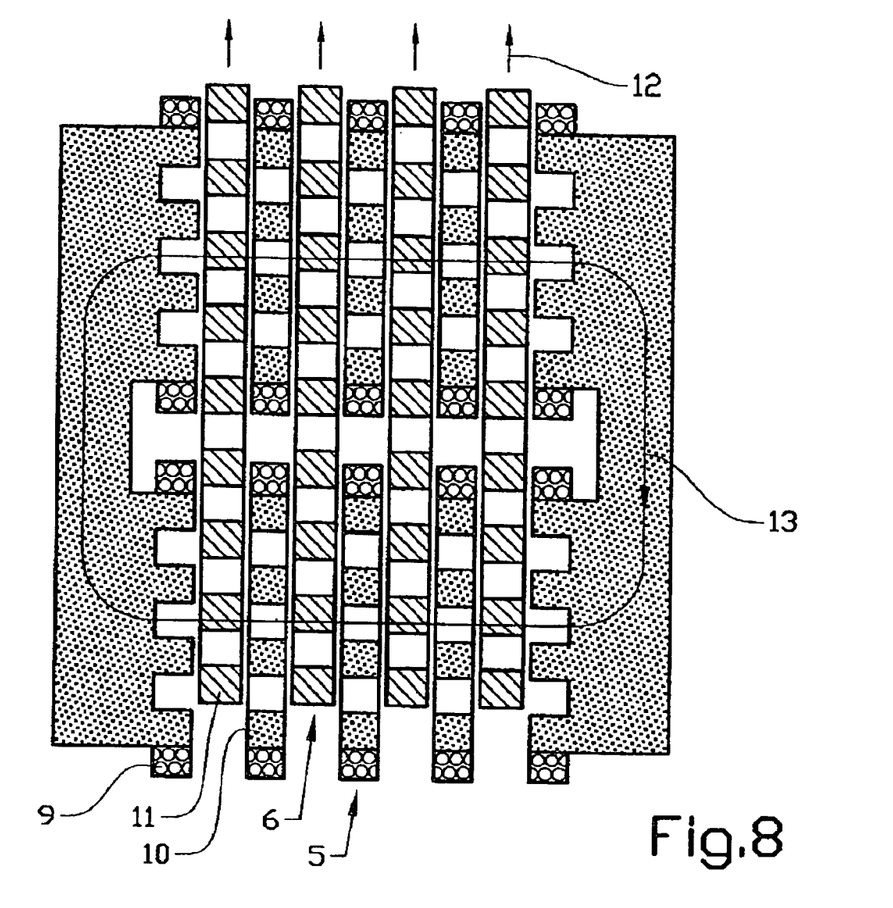
FIG. 8 shows a split side view of the electric machine configured according to embodiment of FIG. 7.

In a second advantageous development of the electric machine as depicted in FIGS. 7 and 8, the electric machine is laid out as a flat linear machine. FIG. 7 shows a top view of the electric machine with the coils 9 opened to improve visibility. FIG. 8 shows a split side view along the line B—B from FIG. 7. In this example, the electric machine has four rotor segments 6 and ten stator segments 5 positioned in two groups after each other with respect to the moving direction 12 of the electric machine. The two groups of stator segments 5 are mechanically and magnetically connected with a magnetic field conducting structure, enabling a closed magnetic circuit 13. In this example, the closed magnetic circuit 13 of the electric machine will be perpendicular to the moving direction 12. The function of the electric machine is the same as described above. The stator 2 and the rotor 3 are fitted with a suitable bearing arrangement.

The invention must not be regarded as being limited to the preferred embodiments described above; a number of further variants and modifications are feasible without departing from the scope of the patent claims. An electrical machine configured according to the present invention may be used wherever a small and efficient electric machine is desired, for example, to control valves on a combustion engine.

What is claimed is:
1. An electric machine comprising:
  a first member and a second member, said second member being movable in relation to the first member;
  said first and second members constituting a closed magnetic circuit;
  said first member comprises at least one coil and a plurality of first segments, each first segment comprises a plurality of first sections, each first section being a first magnetic field altering component;

said second member comprises a plurality of second segments, each second segment comprising a plurality of second sections, each second section being a second magnetic field altering component; and wherein each first segment further comprises at least one coil encompassing said first sections.

2. An electric machine comprising:

a first member and a second member, said second member being movable in relation to the first member;

said first and second members constituting a closed magnetic circuit;

said first member comprises at least one coil and a plurality of first segments, each first segment comprises a plurality of first sections, each first section being a first magnetic field altering component;

said second member comprises a plurality of second segments, each second segment comprising a plurality of second sections, each second section being a second magnetic field altering component; and wherein said segments of the first and second members are positioned adjacent to each other so that said segments are positioned within the closed magnetic circuit of the electric machine.

3. An electric machine comprising:

a first member and a second member, said second member being movable in relation to the first member;

said first and second members constituting a closed magnetic circuit;

said first member comprises at least one coil and a plurality of first segments, each first segment comprises a plurality of first sections, each first section being a first magnetic field altering component;

said second member comprises a plurality of second segments, each second segment comprising a plurality of second sections, each second section being a second magnetic field altering component; and wherein said first magnetic field altering components are made of permanent magnets with their magnetic field oriented in the same direction and said second magnetic field altering components are made of an iron-powder material.

4. An electric machine comprising:

a first member and a second member, said second member being movable in relation to the first member;

said first and second members constituting a closed magnetic circuit;

said first member comprises at least one coil and a plurality of first segments, each first segment comprises a plurality of first sections, each first section being a first magnetic field altering component;

said second member comprises a plurality of second segments, each second segment comprising a plurality of second sections, each second section being a second magnetic field altering component; and wherein said first magnetic field altering components and said second magnetic field altering components are of the same type.

5. An electric machine comprising:

a first member and a second member, said second member being movable in relation to the first member;

said first and second members constituting a closed magnetic circuit;

said first member comprises at least one coil and a plurality of first segments, each first segment comprises a plurality of first sections, each first section being a first magnetic field altering component;

said second member comprises a plurality of second segments, each second segment comprising a plurality of second sections, each second section being a second magnetic field altering component;

wherein said electric machine further comprises a plurality of first members positioned adjacent to each other along a longitudinal axis, said first members being further characterized by at least one of the following: (i) said first members include three first members electrically phase displaced by 120 degrees; and (ii) said first members are electrically phase displaced in an uniform manner so that the phase displacement is derived by dividing a full cycle with the number of first members.

6. The electric machine as recited in any one of claims 1–5, wherein said second member is movable in relation to the first member along a longitudinal axis of the electric machine.

7. The electric machine as recited in any one of claims 1–5, wherein said segments of the first and second members are perpendicular to the closed magnetic circuit of the electric machine.

8. The electric machine as recited in any one of claims 1–5, wherein said segments of the first and second members extend along the longitudinal axis of the electric machine.

9. The electric machine as recited in any one of claims 1–5, wherein said spacing between the segments of the first and second members are substantially uniform.

10. The electric machine as recited in any one of claims 1–5, wherein said first magnetic field altering components and said second magnetic field altering components are made of at least one of an iron-powder material, a ferrite material, an iron core coil, an air coil and a permanent magnet.

11. The electric machine as recited in any one of claims 1, 2, 4 and 5, wherein said first magnetic field altering components are made of permanent magnets with their magnetic field oriented in the same direction and said second magnetic field altering components are made of an iron-powder material.

12. The electric machine as recited in claim 11, wherein between said permanent magnets having their magnetic fields oriented in the same direction are positioned permanent magnets with their magnetic field oriented in the opposite direction.

13. The electric machine as recited in any one of claims 1–5, wherein said first magnetic field altering components are made of at least one of an iron-powder material, a ferrite material and a permanent magnet and said second magnetic field altering components are made of air coils.

14. The electric machine as recited in any one claims 1–3 and 5, wherein said first magnetic field altering components and said second magnetic field altering components are of the same type.

15. The electric machine as recited in any one of claims 1–5, wherein at least one of said first segments and said second segments comprises a plurality of different magnetic field altering components.

16. The electric machine as recited in any one of claims 1–4, wherein said electric machine further comprises a plurality of first members positioned adjacent to each other along a longitudinal axis.

* * * * *